April 20, 1954     H. H. SHYCON     2,675,669
EXPANSION STRAP
Filed Aug. 17, 1951
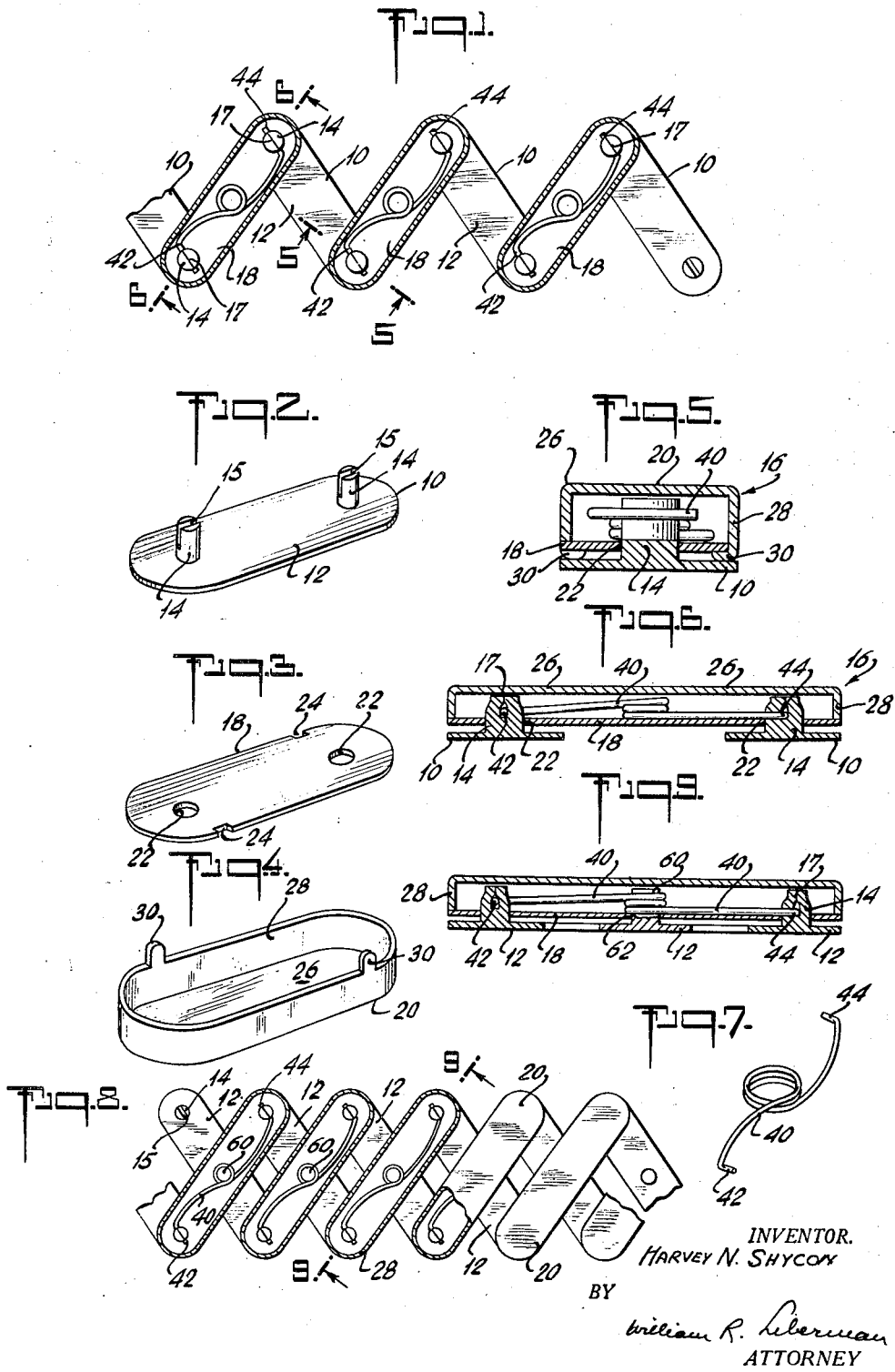
INVENTOR.
HARVEY N. SHYCON
BY
William R. Lieberman
ATTORNEY Patented Apr. 20, 1954

2,675,669

UNITED STATES PATENT OFFICE 2,675,669

EXPANSION STRAP

Harvey N. Shycon, New Haven, Conn.

Application August 17, 1951, Serial No. 242,215

7 Claims. (Cl. 59—79)

The present invention relates generally to self-contracting, expandable linkages. In particular, it relates to link arrangements which are normally self-contracting, but easily expandable for use particularly as wrist-watch straps, bracelets, belts and for similar purposes.

In prior structures of this general type, the link and spring arrangements are of such complexity as to be quite costly, since their manufacture and assembly require considerable skill and experience. The structure of the present invention is relatively simple, and the component parts, few in number, may be made and assembled easily and quickly.

A main object of the present invention is the provision of an expandable, self-retracting linkage which is controlled by springs disposed and located only within alternate linkage elements.

Another object of the present invention is the provision of an expandable, normally self-retracting linkage, which is controlled by tension means located in alternately disposed elements of the linkage, operating on the elements on both sides thereof.

Still another object of the present invention is the provision of a normally self-retracting and expandable linkage formed of alternately disposed, end-to-end pivotally connected male and female link members, the movement thereof being controlled by tension means disposed only within the female links, but operatively associated with the male member connected to both ends of each female link element.

Another object of the present invention is the provision of a normally self-retracting and expandable linkage comprising a plurality of alternately disposed male and female elements, the female elements being hollow, and the male elements having a stud at each end thereof projecting into ends of adjacent female elements, and tension within each female element operatively associated with the projecting studs of the adjacent elements.

Other and further objects of the present invention will in part be obvious and in part will be specifically pointed out in the following description of several illustrative embodiments.

In the drawings annexed hereto and forming a part hereof,

Figure 1 is a plan view, partly in section, of a portion of linkage constructed according to and embodying the present invention;

Figure 2 is a perspective view of a male link component in accordance with my invention;

Figure 3 is a perspective view of the floor portion of the female link component in accordance with the invention;

Figure 4 is a perspective view of the cap portion of the female link component;

Figure 5 is a section on the line 5—5 of Figure 1;

Figure 6 is a section on the line 6—6 of Figure 1;

Figure 7 is a perspective view of one form of spring tension means in accordance with the invention;

Figure 8 is a plan view of a modified form of linkage, also in accordance with the present invention, partly in section; and Figure 9 is a section thereof on the line 9—9 of Figure 8.

In the form of linkage construction of Figures 1 to 6 inclusive, there is provided a plurality of male elements 10, 10, each comprising an elongated plate 12, and having an upwardly projecting stud 14 adjacent each end thereof, the stud being vertically slitted as at 15 for reasons to be developed below. While a vertically upstanding stud, as 14, has been shown herein, it is to be understood that what is required is a means on the plate 12 to anchor an end of a spring or other tension means, and that stud 14 is thus merely exemplary, and not limiting.

There is also provided a plurality of female elements 16, 16, each consisting of floor portion 18 and a hollow cover or shell portion 20, the cover 20 overlying and covering the floor 18. The floor 18 comprises a flat plate having an aperture 22 at each end thereof, and a pair of notches 24, 24 on opposite sides and opposite ends, as in Figure 3. Each cover 20 consists of a flat portion 26 and a downwardly depending surrounding wall 28. As seen in Figure 3, cover 20 is so shaped and dimensioned as to overlie and rest upon floor 18. A pair of downwardly extended fingers 30, 30 are provided on wall 28, on opposite sides and on opposite ends of the cover shell, fingers 30, 30 being aligned with notches 24, 24.

In assembling the components of the linkage, a stud 14 of one male element 10 is inserted through an aperture 22 of the floor 18 of a female element. The other stud 14 of the same male element 10 is inserted through an aperture 22 of floor component 18 of a second female element. Each male element is thus pivotally interfitted with two female elements, one at each end thereof, and in like manner, each female element is pivotally interfitted with two male elements, one at each end thereof. After the studs are threaded through the floor portions of the female elements, they may be clinched or otherwise secured against withdrawal, in any usual or convenient manner known in the art (not shown).

A tension means, as spring 40, is provided for each female element, said spring 40 being normally biased so that if an end 42 thereof is fixed, the other end 44 will be urged clockwisely with respect to the fixed end. Each tension means 40 are of such length as to be entirely disposable within the female component 16, and the ends 42, 44 (under tension) are locked to studs 14, 14 as by threading same through the slits 15, 15 of the studs 14, 14 and permanently secured as by clinching the stud end together, as at 17.

It is necessary, as will be obvious, that spring 40 be under positive tension when fitted into the female elements in order for the linkage to be normally contractible, the operation of the spring being detailed below.

After the springs 40, 40 are disposed atop the floor portions 18, 18 of the female elements, the cover shells 20, 20 are disposed and fastened thereover and locked to floors 18, 18 by bending fingers 30, 30, fitted through notches 24, 24, over and against the underside of the floors. Other conventional means, well known in the art, may be employed for fastening the covers onto the floor components, as peening, beading, etc., the finger prongs shown being merely exemplary and not limitative. The linkage as a whole is ready for operation. When the links are pulled apart and distended against the normal biasing of springs 40, 40, into the position of Figure 1, the springs are further loaded. This further loading occurs because the studs on opposite ends swivel or turn, acting on the trapped spring means to further tension the same. Thus, when the expansive force is released, the elements will be automatically retracted under the increased tensioning, and the male and female elements swivel back towards their side-by-side relationship, or approach said relationship.

As will be obvious from the foregoing, the female elements will swivel freely about the studs 14, 14 subject to the control of the springs disposed inside the shells or the studs and their male elements will swivel freely inside the shells. With the construction above described, the male and female elements are pivotally interconnected at their ends, and the tension means disposed within each female element operatively associated with a pair of male elements, one at each end thereof, controls the movement or swivel action of the stud pivot to the extent that each spring has a part in effecting the automatic retraction of the elements so that the male elements, and the female elements will be urged normally into side-by-side relationship, the male elements in one plane and the female elements in another plane. In this embodiment of the invention, the female elements, it will be appreciated, are merely free swinging space connectors, functioning merely to house the springs and to keep the male components 10, 10 in alignment.

In the form of linkage of Figures 8 and 9, wherein parts similar to the form of Figures 1 to 6 are identified by similar reference numerals, the male and female link elements are additionally and centrally pivoted in a lazy tong arrangement, a centrally disposed stud 60 on plate 12 projecting through floor 18 via a third aperture 62 therein. Springs 40, 40 when of the coil type as shown, may be disposed about stud 60 and located thereby. In this modification, the number of male and female elements is doubled, but the linkage otherwise functions as does the form of Figures 1 to 6.

The elements of the present invention may be cast, stamped or otherwise formed of metal, plastics or the like, the desiderata being the provision of means projecting into the female components from the male components to which the tension means are anchored.

Having described my invention, what I claim and desire to secure by Letters Patent is:

1. An extensible, self-retracting linkage comprising at least in part a plurality of end-to-end pivoted elements, each element pivoting about the ends of the adjacent elements, a single spring wholly disposed within each alternately disposed element and expansible and contractible therewithin, the ends of each of which springs are fixedly secured to the intervening elements through the pivots of the elements at each end thereof and loaded in response to pivotal movement of said elements apart from each other, the springs being normally tensioned to retain respectively the alternate and the other elements in side-by-side abutting relationship and to resist pivotal movement of the elements apart from each other.

2. An extensible, self-retracting linkage comprising at least in part a plurality of alternately disposed and end-pivotally interconnected male and female elements, each element pivoting about the ends of the elements at each end thereof, a single spring wholly disposed within each female element and expansible and contractible therewithin, the ends of which spring are fixedly secured to the intervening elements through the pivots of the male elements at each end of each female element, the spring being normally tensioned to retain the male and female elements respectively in side-by-side abutting relationship and to resist pivotal movement of the elements apart from each other, and the spring is further loaded in response to pivotal movement of the male elements away from the associated female elements.

3. An extensible, self-retracting linkage comprising at least in part a plurality of end-to-end pivoted male and female elements, projections at the ends of each male element fitting into the opposite ends of adjacent female elements, a single spring wholly disposed within each female element and expansible and contractible therewithin, the ends of which spring are fixedly secured to the intervening elements through the interfitted projections of the associated male elements, said spring being tensioned normally to resist spreading apart of the elements, and further loaded in response to pivotal movement of the male elements away from the associated female elements.

4. A linkage as in claim 3, wherein the projections comprise the pivots for the female elements and the spring ends are fixed to the projections.

5. A linkage as in claim 3, in which the projections comprise the pivots for the female elements and the projections constitute elongated studs vertically slitted to receive and retain the spring ends.

6. An extensible, self-retracting linkage comprising at least in part a plurality of end-to-end pivoted elements, each alternate element pivoting about the ends of the elements at each end thereof, a single spring wholly disposed and contractible and expansible within each alternate element, the ends of which spring are fixedly secured to the intervening elements through the pivots of the elements at each end thereof and tensioned normally to retain said elements in side-by-side and edge-abutting relationship and to resist pivotal movement of the elements apart from each other, and the spring is further loaded in response to pivotal movement of the said elements apart from each other.

7. An extensible, self-retracting linkage comprising at least in part a plurality of alternately disposed and end-pivotally interconnected male and female elements, each female element pivoting about the ends of the male elements at each end thereof, a single spring wholly disposed and contractible and expansible within each female element, the ends of which spring are fixedly secured to the intervening elements through the pivots at the opposite ends of the male elements on both ends of each female element, the spring being loaded in response to pivotal movement of said male elements apart from the associated female elements, and the spring is normally tensioned to retain the female and male elements respectively in side-by-side, edge-abutting relationship and to resist spreading of the male elements and the female elements apart from each other.

References Cited in the file of this patent

UNITED STATES PATENTS

| Number | Name | Date |
|---|---|---|
| 2,344,455 | Bertherman | Mar. 14, 1944 |
| 2,376,633 | Szeglin | May 22, 1945 |
| 2,433,766 | Kubice | Dec. 30, 1947 |

FOREIGN PATENTS

| Number | Country | Date |
|---|---|---|
| 20,053 | Great Britain | Sept. 21, 1898 |
| 258,932 | France | Jan. 1, 1946 |
| 616,433 | Great Britain | Jan. 21, 1949 |